US012784492B2

(12) United States Patent
Jeon et al.

(10) Patent No.: US 12,784,492 B2
(45) Date of Patent: Nov. 3, 2026

(54) DEVICE AND METHOD FOR ACQUIRING HEART RATE

(71) Applicants: Hyundai Motor Company, Seoul (KR); Kia Corporation, Seoul (KR); Sangmyung University Industry-Academy Cooperation Foundation, Seoul (KR)

(72) Inventors: Yonggwon Jeon, Hwaseong-si (KR); JeeEun Lee, Hwaseong-si (KR); Kangin Lee, Hwaseong-si (KR); Euichul Lee, Seoul (KR); Kunyoung Lee, Seoul (KR); Seunghyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 172 days.

(21) Appl. No.: 18/937,449

(22) Filed: Nov. 5, 2024

(65) Prior Publication Data

US 2025/0166409 A1 May 22, 2025

(30) Foreign Application Priority Data

Nov. 20, 2023 (KR) ........................ 10-2023-0160496

(51) Int. Cl.
*G06V 40/10* (2022.01)
*G06V 10/60* (2022.01)
(Continued)

(52) U.S. Cl.
CPC .............. *G06V 40/15* (2022.01); *G06V 10/60* (2022.01); *G06V 10/82* (2022.01); *G06V 10/993* (2022.01); *G06V 20/597* (2022.01); *G06V 40/171* (2022.01)

(58) Field of Classification Search
CPC ........ G06V 40/15; G06V 10/60; G06V 10/82; G06V 10/993; G06V 20/597; G06V 40/171; A61B 5/024; A61B 5/0004; A61B 5/0245; A61B 5/0261; A61B 2503/12; A61B 2503/22; A61B 5/02416; A61B 5/0013;
(Continued)

(56) References Cited

U.S. PATENT DOCUMENTS

2020/0397306 A1* 12/2020 Frank ........................ G01J 5/10

FOREIGN PATENT DOCUMENTS

KR 10-2468648 B1 11/2022

* cited by examiner

*Primary Examiner* — Stephen R Koziol
*Assistant Examiner* — Michael Kim Maiden
(74) *Attorney, Agent, or Firm* — MORGAN, LEWIS & BOCKIUS LLP

(57) ABSTRACT

In a device and a method for obtaining a heart rate, the device for obtaining a heart rate may include: a processor; and a memory device, and obtain a first band image and a second band image in different bands, measure a first remote heart rate signal and a second remote heart rate signal for the first band image and the second band image, respectively, compute a first quality score and a second quality score for the first band image and the second band image, respectively, select a first effective heart rate section based on the first remote heart rate signal and the first quality score, select a second effective heart rate section based on the second remote heart rate signal and the second quality score, and determine a complementary heart rate based on the first effective heart rate section and the second effective heart rate section.

20 Claims, 10 Drawing Sheets

(51) Int. Cl.
*G06V 10/82* (2022.01)
*G06V 10/98* (2022.01)
*G06V 20/59* (2022.01)
*G06V 40/16* (2022.01)

(58) Field of Classification Search
CPC ......... A61B 5/0077; A61B 5/18; A61B 5/721; A61B 5/7264; G16H 30/20
See application file for complete search history.

DEVICE AND METHOD FOR ACQUIRING HEART RATE

CROSS-REFERENCE TO RELATED APPLICATION

The present application claims priority to Korean Patent Application No. 10-2023-0160496 filed on Nov. 20, 2023, the entire contents of which is incorporated herein for all purposes by this reference.

BACKGROUND OF THE PRESENT DISCLOSURE

Field of the Present Disclosure

The present disclosure relates to a device and a method for obtaining a heart rate.

Description of Related Art

While traditional Photoplethysmography (PPG) technology directly attaches a sensor to the body and measures a blood flow change of a blood vessel in the body, the Remote Photoplethysmography (rPPG) technology can measure the blood flow change in a non-contact mode, so that the usefulness of the rPPG technology is recognized in various application fields, such as providing remote medical care by continuously tracking a human health condition through the rPPG or collecting patient physiological data remotely. Furthermore, the rPPG technology may be used to infer heart rate and analyze heart rate changes to infer human emotional status, or to monitor the state of a vehicle driver, for example stress level, excitement level, and drowsy driving. However, the rPPG technology may be affected accuracy by the change of lighting (e.g., the change of lighting due to strong external light sources, reflective light, etc.) or the movement of the object.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and a method for obtaining a heart rate, which are configured for determining a remote heart rate with high accuracy and reliability for a driver or a passenger in a vehicle.

An exemplary embodiment of the present disclosure provides a device for obtaining a heart rate, which may include: one or more processors; and one or more memory devices, in which the one or more memory devices may include program codes, and the program codes may be executed by the one or more processors, and may obtain a first band image and a second band image in different bands, measure a first remote heart rate signal and a second remote heart rate signal for the first band image and the second band image, respectively, compute a first quality score and a second quality score for the first band image and the second band image, respectively, select a first effective heart rate section based on the first remote heart rate signal and the first quality score, select a second effective heart rate section based on the second remote heart rate signal and the second quality score, and determine a complementary heart rate based on the first effective heart rate section and the second effective heart rate section.

In some exemplary embodiments of the present disclosure, the determining of the first quality score and the second quality score may include determining a first movement quality score and a second movement quality score, and the first movement quality score is determined by measuring a change of a face feature point in frames adjacent to each other with respect to the first band image, and the second movement quality score is determined by measuring a change of a face feature point in frames adjacent to each other with respect to the second band image.

In some exemplary embodiments of the present disclosure, the determining of the first quality score and the second quality score may include determining a first lighting quality score and a second lighting quality score, and the first lighting quality score may be determined by measuring a brightness change amount with respect to the first band image, and the second lighting quality score may be determined by measuring a brightness change amount with respect to the second band image.

In some exemplary embodiments of the present disclosure, the determining of the first quality score and the second quality score may include determining a first signal quality score and a second signal quality score, the first signal quality score may be determined by measuring a signal quality based on frequency spectrum characteristics which a remote heart rate signal has with respect to the first band image, and the second signal quality score may be determined by measuring the signal quality based on frequency spectrum characteristics which the remote heart rate signal has with respect to the second band image.

In some exemplary embodiments of the present disclosure, the selecting of the first effective heart rate section may include predicting an error value from a model trained through the first quality score, making a section in which the predicted error value is less than or equal to a predetermined first threshold be included in the first effective heart rate section, and making a section in which the predicted error value is more than the first threshold be not included in the first effective heart rate section.

In some exemplary embodiments of the present disclosure, the selecting of the second effective heart rate section may include predicting an error value from a model trained through the second quality score, making a section in which the predicted error value is less than or equal to a predetermined second threshold be included in the second effective heart rate section, and making a section in which the predicted error value is more than the second threshold be not included in the second effective heart rate section.

In some exemplary embodiments of the present disclosure, the first threshold may be determined as an error value corresponding to the highest x % (x is a positive real number) in which the error value of the result predicted from the model trained through the first quality score is the smallest, and the second threshold may be determined as an error value corresponding to the highest y % (y is a positive real number) in which the error value of the result predicted from the model trained through the second quality score is the smallest.

In some exemplary embodiments of the present disclosure, the model may include at least one of a Long Short-Term Memory (LSTM) model, a random forest model, and a Singular value Decomposition (SVD) model.

In some exemplary embodiments of the present disclosure, the determining of the complementary heart rate may include determining the complementary heart rate by use of a predetermined weight when a partial section of the first effective heart rate section and a partial section of the second effective heart rate section are overlapped, and heart rates predicted in the overlapped sections are different from each other.

In some exemplary embodiments of the present disclosure, the first band image may include a visible-ray image, and the second band image includes an infrared image.

Another exemplary embodiment of the present disclosure provides a device for obtaining a heart rate, which may include: one or more processors; and one or more memory devices, in which the one or more memory devices may include program codes, and the program codes may be executed by the one or more processors, and may obtain a first band image and a second band image in different bands, measure a first remote heart rate signal and a second remote heart rate signal for the first band image and the second band image, respectively, compute a movement quality score, a lighting quality score, and a signal quality score for each of the first band image and the second band image, select a first effective heart rate section based on the first remote heart rate signal and the first quality score, select a second effective heart rate section based on the second remote heart rate signal and the second quality score, and determine a complementary heart rate based on the first effective heart rate section and the second effective heart rate section.

In some exemplary embodiments of the present disclosure, the movement quality score may be determined by use of Equation (1) below:

$$M_k = \sum_{n=1}^{4} \left(b_{k_n} - b'_{k_n}\right)/4 \tag{1}$$

Here, k represents a number indicating region of interest (ROI), n represents an index indicating a vertex of square ROI, b represents a current frame, and b' represents a previous frame.

In some exemplary embodiments of the present disclosure, the lighting quality score may be determined by use of Equations (2), (3) and (4) below:

$$\sigma_k = \sqrt{\frac{\sum_{\gamma=1}^{n} \left(X_\gamma - \bar{X}\right)^2}{n}} \tag{2}$$

$$I_k = \mathrm{Max}(X_k) - \mathrm{Min}(X_k) \tag{3}$$

$$X_k = \{X_1, X_2, \ldots, X_n\} \tag{4}$$

Here, k represents the sum of number of divided regions and the total number of regions, and n represents the number of time-series data, and X represents a brightness value, and $\bar{X}$ represents the mean value of X.

In some exemplary embodiments of the present disclosure, the signal quality score may be determined by use of Equation (5) below:

$$SNR = 10\log_{10}\left(\frac{\sum_{42}^{180} \left(U_t(f)\hat{S}(f)\right)^2}{\sum_{42}^{180} \left((1 - U_t(f))\hat{S}(f)\right)^2}\right) \tag{5}$$

Here, $U_t(f)$ represents a template window binary function, and $\hat{S}(f)$ represents a power spectral density function.

In some exemplary embodiments of the present disclosure, the selecting of the first effective heart rate section may include predicting an error value from a model trained through the first quality score, making a section in which the predicted error value is less than or equal to a predetermined first threshold be included in the first effective heart rate section, and making a section in which the predicted error value is more than the first threshold be not included in the first effective heart rate section.

In some exemplary embodiments of the present disclosure, the selecting of the second effective heart rate section may include predicting an error value from a model trained through the second quality score, making a section in which the predicted error value is less than or equal to a predetermined second threshold be included in the second effective heart rate section, and making a section in which the predicted error value is more than the second threshold be not included in the second effective heart rate section.

Various exemplary embodiments provides a method for obtaining a heart rate, the method which may include: obtaining a first band image and a second band image in different bands; measuring a first remote heart rate signal and a second remote heart rate signal for the first band image and the second band image, respectively; determining a first quality score and a second quality score for the first band image and the second band image, respectively; selecting a first effective heart rate section based on the first remote heart rate signal and the first quality score; selecting a second effective heart rate section based on the second remote heart rate signal and the second quality score; and determining a complementary heart rate based on the first effective heart rate section and the second effective heart rate section.

In some exemplary embodiments of the present disclosure, the determining of the first quality score and the second quality score may include determining a first movement quality score and a second movement quality score, and the first movement quality score may be determined by measuring a change of a face feature point in frames adjacent to each other with respect to the first band image, and the second movement quality score may be determined by measuring a change of a face feature point in frames adjacent to each other with respect to the second band image.

In some exemplary embodiments of the present disclosure, the determining of the first quality score and the second quality score may include determining a first lighting quality score and a second lighting quality score, and the first lighting quality score may be determined by measuring a brightness change amount with respect to the first band image, and the second lighting quality score may be determined by measuring a brightness change amount with respect to the second band image.

In some exemplary embodiments of the present disclosure, the determining of the first quality score and the second quality score may include determining a first signal quality score and a second signal quality score, the first signal quality score may be determined by measuring a signal quality based on frequency spectrum characteristics which a remote heart rate signal has with respect to the first band image, and the second signal quality score may be determined by measuring the signal quality based on frequency spectrum characteristics which the remote heart rate signal has with respect to the second band image.

According to exemplary embodiments of the present disclosure, even if a variety of lighting changes, including solar light, traffic lights in a vehicle driving environment, or transportation traffic lights, or noise such as the movement of the face of the driver or passenger, a remote heart rate with high accuracy and reliability may be stably determined for a driver or a passenger in a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
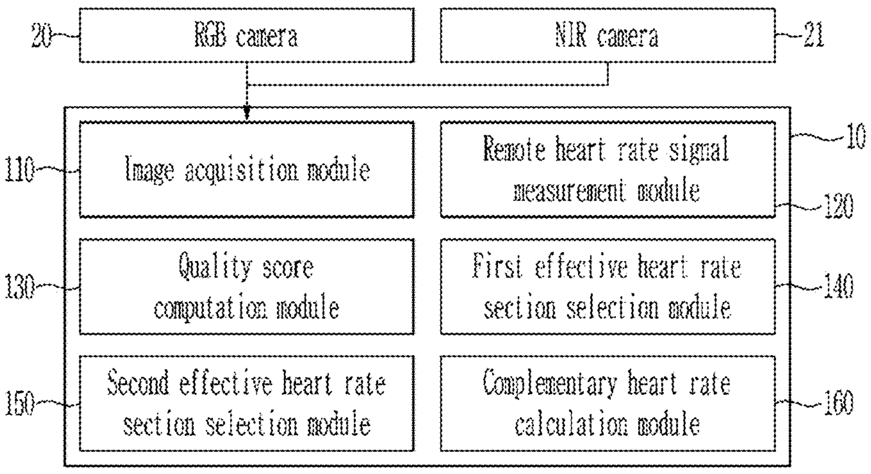
FIG. 1 is a block diagram for describing a device for obtaining a heart rate according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, various exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and the claims, unless explicitly described to the contrary, the word “comprise”, and variations such as “comprises” or “comprising”, will be understood to imply the inclusion of stated elements but not the exclusion of any other elements. Terms including an ordinary number, such as first and second, are used for describing various constituent elements, but the constituent elements are not limited by the terms. The terms are used only to discriminate one component from another component.

Terms including “part’, “~er”, “module”, and the like included in the specification mean a unit that can process at least one function or operation and this may be implemented by hardware or a circuit, or software or a combination of hardware or the circuit and software. Furthermore, at least some components or functions of a device and a method for obtaining a heart rate according to exemplary embodiments described below may be implemented as a program or software and the program or software may be stored in a computer readable medium.

FIG. 1 is a block diagram for describing a device for obtaining a heart rate according to an exemplary embodiment of the present disclosure.

Referring to FIG. 1, the heart rate obtaining device 10 according to various exemplary embodiments of the present disclosure may include one or more processors and one or more memory devices. For example, the heart rate obtaining device 10 may be implemented as a computing device 50 described below in relation to FIG. 10. In the instant case, one or more processors may correspond to a processor 510 of the computing device 50, and one or more memory devices may correspond to a memory 520 of the computing device 50.

One or more memory devices of the heart rate obtaining device 10 may include program codes executed by one or more processors. The program codes are executed to perform functions obtaining a remote heat rate with high accuracy and reliability for a driver or a passenger in a vehicle, and for the clarity and convenience of the description, the functions are described by use of the term “module” in the present specification.

The heart rate obtaining device 10 may include an image acquisition module 110, a remote heart rate signal measurement module 120, a quality score computation module 130, a first effective heart rate section selection module 140, a second effective heart rate section selection module 150, and a complementary heart rate acquisition module 160.

The image acquisition module 110 may obtain a first band image and a second band image in different bands. In some exemplary embodiments of the present disclosure, the first band image may include a visible-ray image and the second band image may include an infrared image. In the present specification, for the clarity and convenience of the description, the visible-ray image and the infrared image are described as the images in different bands obtained by the image acquisition module 110, but the spirit of the present disclosure is not limited thereto. For example, the image acquisition module 110 may obtain an image corresponding to any first frequency band not particularly limited to the visible-ray band and an image including any second frequency band different from the first frequency band, and not limited to the infrared band, and the heart rate obtaining device 10 may perform the heart rate acquisition described below from the images.

The image acquisition module 110 may obtain the first band image and the second band image in different bands by use of a plurality of cameras which may obtain images in different spectrum ranges. In some exemplary embodiments of the present disclosure, the image acquisition module 110 may obtain the first band image by use of an RGB camera 20, and obtain the second band image by use of a near-infrared (NIR) camera 21. The RGB camera 20 may detect a visible-ray spectrum of approximately 380 to 740 nm which may be viewed with human eyes, and provide an image expressed with various colors by combining three basic colors of red, green, and blue. The RGB camera 20 may be used in various fields such as general photo shooting, video recording, etc., but may show a limited performance in a continuous solar light change which occurs in a low-illumination environment or during vehicle driving. Meanwhile, the NIR camera 21 may detect an infrared spectrum which exceeds a visible-ray range, in particular, a near infrared region between approximately 750 nm and 1400 nm, and may generate an image based on a thermal pattern or specific infrared reflection characteristics of an object. Since the NIR camera 21 does not depend on the visible ray, the NIR camera 21 may be useful even in a low-illumination environment, and may not be affected by an illumination due the solar light. The heart rate obtaining device 10 may be configured to determine a complementary heart rate with improved accuracy by considering mutual characteristics of remote heart rate signals for different wavelength bands as described above.

In some exemplary embodiments of the present disclosure, the RGB camera 20 may use a charge coupled device (CCD) image sensor or a complementary metal-oxide semiconductor (CMOS) image sensor to capture an image. The CCD sensor may operate in a scheme of converting light into a charge, and then converting the charge into an analog signal, and the image may be read in a scheme of moving the charge between pixels. Meanwhile, the CMOS sensor may perform separate charge voltage conversion for each pixel, and signal processing may be made at a pixel level. In general, the CCD sensor provides a high image quality, but is higher in cost and large in power consumption, while the CMOS sensor may be comparatively inexpensive, and may be high in power efficiency, and may provide a high processing speed.

In some exemplary embodiments of the present disclosure, the NIR camera 21 may use a monochrome sensor. The monochrome sensor as an image sensor specialized to detect light of a near infrared spectrum may not capture color information, but may record only brightness or intensity information in a black and white image. Since the monochrome sensor has no color filter, the monochrome sensor provides a higher sensitivity and is configured for effective image capturing in the low-illumination environment. Furthermore, since the monochrome sensor need not process the color information, the monochrome sensor may provide minute image details and a higher resolution. The NIR camera 21 may use the monochrome sensor which may detect an infrared wavelength of approximately 930 to 950 nm, which includes a high solar light absorption in the atmosphere particularly. Meanwhile, the NIR camera 21 may operate jointly with an infrared lighting machine provided in the vehicle and illuminating infrared rays to the driver or the passenger, and a bandpass filter passing a near infrared wavelength of a predetermined range, and blocking light of other wavelengths.

The remote heart rate signal measurement module 120 may measure a first remote heart rate signal and a second remote heart rate signal for the first band image and the second band image obtained by the image acquisition module 110, respectively. When the first band image includes the visible-ray image and the second band image includes the infrared image, the first band image may be a 3-channel image sequence obtained by use of the RGB camera 20, and the second band image may be a single-channel image sequence obtained by use of the NIR camera 21.

In some exemplary embodiments of the present disclosure, the remote heart rate signal measurement module 120 obtains an image for a face of a vehicle driver or passenger by use of the RGB camera 20, and detects a face region and a feature point in the image to define a region of interest (ROI). Next, the remote heart rate signal measurement module 120 may perform signal processing preprocessing including obtaining an average brightness value for a skin region in the face region, removing a trend line, and bandpass filtering, and extract the remote heart rate signal by use of an algorithm for extracting the heart rate signal. In some exemplary embodiments of the present disclosure, the algorithm for extracting the heart rate signal may include at least one of Chrominance-based Method (Chrom), Optical Noise Injection Technique (ONIT), Principal Component Analysis (PCA), and Plane Orthogonal to Skin-Tone (POS). The Chrom may measure a blood flow change by heartbeats by detecting a color change of the skin by use of a face that a skin color change is more sensitive to the heartbeats than to the intensity of the light, and ONIT may accurately measure the heart rate by removing noise from the light source under various lighting conditions or in an environment in which there are many movements. The PCA may separate and extract heart rate related information from various color channels by identifying and extracting a principal component from data collected from multiple optical channels, and the POS may extract the heart rate related information by separating a signal related to a change of the skin color by analyzing a component vertical to a plane indicating the skin color change. Thereafter, the remote heart rate signal measurement module 120 may measure the remote heart rate by determining a maximum frequency component by performing frequency analysis for the extracted remote heart rate signal.

In some exemplary embodiments of the present disclosure, the remote heart rate signal measurement module 120 obtains an image for a face of a vehicle driver or passenger by use of the NIR camera 21, and detects a face region and a feature point in the image to define a region of interest (ROI). Next, the remote heart rate signal measurement module 120 may perform signal preprocessing including obtaining an average brightness value for a skin region in the face region, removing a trend line, and bandpass filtering, and extract the remote heart rate signal by use of an algorithm for extracting the heart rate signal. Thereafter, the remote heart rate signal measurement module 120 may measure the remote heart rate by determining a maximum frequency component by performing frequency analysis for the extracted remote heart rate signal. In some exemplary embodiments of the present disclosure, an algorithm for extracting the heart rate signal may include at least one of a green method, and DistancePPG. The green method may extract the heart rate signal by detecting the minute color change of the skin by use of characteristics of a green channel, and the DistancePPG may perform a correction to a predetermined heart rate signal even though a distance between the camera and a target is changed. Thereafter, the remote heart rate signal measurement module 120 may measure the remote heart rate by determining a maximum frequency component by performing frequency analysis for the extracted remote heart rate signal.

The quality score computation module 130 may compute a first quality score for the first band image measured by the remote heart rate signal measurement module 120, and compute a second quality score for the second band image. The quality score may be used for selecting an effective heart rate section determined as a section suitable for analysis in the remote heart rate signal measured in the obtained image to increase the reliability of the heart rate acquisition.

In some exemplary embodiments of the present disclosure, the first quality score as an index for measuring noise generated due to head movement of the vehicle driver or passenger or movement of a muscle in a face due to a conversation or expression may include a first movement quality score. For example, the first movement quality score may be determined by measuring a change of a face feature point in frames adjacent to each other with respect to the first band image obtained by the image acquisition module 110, and a movement strength may be measured by use of the first movement quality score. That is, the quality score computation module 130 may measure the change of the face feature point in the adjacent frame to quantitatively measuring device a face movement generated due to the expression and the conversation which become noise elements upon measuring the remote heart rate. In some exemplary embodiments of the present disclosure, the second quality score may include a second movement quality score determined with respect to the second band image in substantially the same scheme as the first movement quality score.

In some exemplary embodiments of the present disclosure, the first quality score as an index for measuring noise due to a lighting change may include a first lighting quality score. For example, the first lighting quality score may be determined by measuring a brightness change amount, that is, an illumination difference which is changed in time series with respect to the first band image obtained by the image acquisition module 110. The quality score computation module 130 extracts brightness information of an input through a Y value in a YCbCr color space in the case of the RGB camera 20, or extracts brightness information of an input from the single-channel image in the case of the NIR camera 21, and utilizes the extracted brightness information as the quality score to quantitatively provide the effectiveness of the extracted heart rate signal. In some exemplary embodiments of the present disclosure, the second quality score may include a second lighting quality score determined with respect to the second band image in substantially the same scheme as the first lighting quality score.

In some exemplary embodiments of the present disclosure, the first quality score may include a first signal quality score for measuring a quality for the heart rate signal by use of a frequency analysis and a Signal to Noise Ratio (SNR) index of the remote heart rate signal. For example, the first signal quality score may be determined by measuring a signal quality based on frequency spectrum characteristics which the remote heart rate signal has with respect to the first band image obtained by the image acquisition module 110. A heart rate cycle has characteristics in which a beats per minute (BPM) change is gradually changed on time series, and for example, the BPM change may be 6 BPM or less on a time series for 10 seconds. This may indicate that the intensity of a frequency component corresponding to the heart rate signal is higher than other frequency components, and indicate that frequency power of a heart rate band is high in the frequency spectrum. As a result, a remote heart rate bandwidth is regarded as a signal and the remaining bandwidth is regarded as noise to evaluate a remote heart rate signal quality. In some exemplary embodiments of the present disclosure, the second quality score may include a second signal quality score determined with respect to the second band image in substantially the same scheme as the first signal quality score.

The first effective heart rate section selection module 140 may select a first effective heart rate section based on the first remote heart rate signal extracted by the remote heart rate signal measurement module 120 and the first quality score determined by the quality score computation module 130.

In some exemplary embodiments of the present disclosure, the first effective heart rate section selection module 140 may be configured to predict an error value from a model trained through the first quality score, and select the first effective heart rate section according to the predicted error value.

The first effective heart rate section selection module 140 makes a section in which the predicted error value is less than or equal to a predetermined first threshold be included in the first effective heart rate section to use the section for determining the heart rate, and makes a section in which the predicted error value is more than the predetermined first threshold not be included in the first effective heart rate section not to use the section for determining the heart rate. Here, the first threshold may be determined as an error value corresponding to the highest x % (x is a positive real number) in which the error value of the result predicted from the model trained through the first quality score is the smallest. For example, the first threshold may be determined as an error value corresponding to the highest 10% in which the error value of the result predicted from the model trained through the first quality score is the smallest, and the first effective heart rate section selection module 140 may select a heart rate signal including the highest 10% of reliability as the first effective heart rate section.

A model trained through the first quality score may adopt a model which is easy to learn time-series data, and for example, adopt at least one of a Long Short-Term Memory (LSTM) model, a random forest model, and a Singular value Decomposition (SVD) model. The LSTM as a kind of recurrent neural network (RNN) may learn long-term dependencies of the time-series data, and the random forest model may be used for multiple decision trees to learn various parts of data and for feature selection or non-linear pattern modeling for the time-series data. The SVD may keep important information while reducing a dimension of complicated data through metrics decomposition, so that the SVD may be used for separate principal components of the time-series data. In some exemplary embodiments of the present disclosure, the LSTM may be adopted to model the dependency of the time-series data, and in some other exemplary embodiments of the present disclosure, the random forest model or the SVD model may be used to determine a main feature of the time-series data.

In some exemplary embodiments of the present disclosure, model training may be performed to input the first remote heart rate signal, the second remote heart rate signal, the movement quality score, the lighting quality score, and the signal quality score described above, and predict the error. Here, the error as a difference value between a correct answer heart rate and a predicted heart rate may namely mean noise generated by movement of a muscle in the face due to conversation or expression, noise due to the lighting change, and signal noise for the heart rate signal. Meanwhile, the first threshold described above may mean the highest 10% error in which the error value is the lowest among all data. When the first remote heart rate signal, the second remote heart rate signal, the movement quality score, the lighting quality score, and the signal quality score are provided as inputs with respect to the model of which training is completed, error prediction of the model may be performed, and thereinafter, when the predicted error is less than or equal to the first threshold, the predicted heart rate value may be stored, and when the predicted error is more than the first threshold, the predicted heart rate value may be discarded. A section finally stored in the entire image by repeating such a process may finally correspond to the first effective heart rate section.

The second effective heart rate section selection module 150 may select a second effective heart rate section based on the second remote heart rate signal extracted by the remote heart rate signal measurement module 120 and the second quality score determined by the quality score computation module 130.

In some exemplary embodiments of the present disclosure, the second effective heart rate section selection module 150 may be configured to predict an error value from a model trained through the second quality score, and select the second effective heart rate section according to the predicted error value. The second effective heart rate section selection module 150 makes a section in which the predicted error value is less than or equal to a predetermined second threshold be included in the second effective heart rate section to use the section for determining the heart rate, and makes a section in which the predicted error value is more than the predetermined second threshold not be included in the second effective heart rate section not to use the section for determining the heart rate. Here, the second threshold may be determined as an error value corresponding to the highest y % (y is a positive real number) in which the error value of the result predicted from the model trained through the second quality score is the smallest. Besides, matters for the first effective heart rate section selection module 140 described above are just referenced for and applied to matters for the second effective heart rate section selection module 150, so a redundant description will be omitted.

The complementary heart rate determination module 160 may be configured to determine a complementary heart rate based on the first effective heart rate section and the second effective heart rate section. Here, the complementary heart rate may mean a heart rate of which accuracy is increased by considering mutual characteristics of remote heart rate signals for different wavelength bands. As a result, compared to a case of determining the heart rate for a single band, two bands are complementarily jointly used, so a section in which the performance of the obtained signal deteriorates due to the noise in each band may be replaced with another band-based section with excellent performance, and a time width in which the heart rate is extracted may be extended.

In some exemplary embodiments of the present disclosure, the complementary heart rate determination module 160 may be configured to determine the complementary heart rate by use of a predetermined weight when a partial section of the first effective heart rate section and a partial section of the second effective heart rate section are overlapped, and heart rates predicted in the overlapped sections are different from each other.

Figure 2:
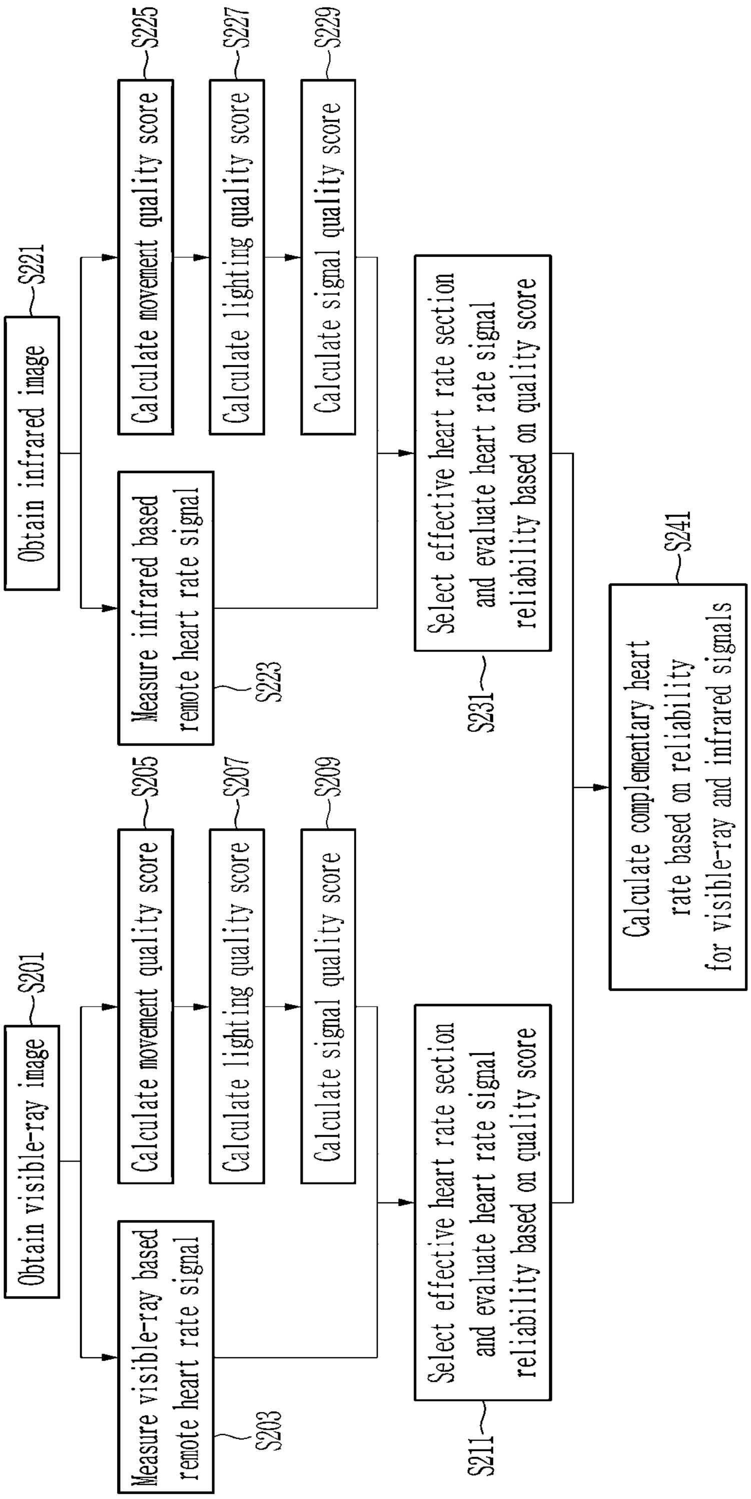
FIG. 2 is a flowchart for describing an operation of a device for obtaining a heart rate according to an exemplary embodiment of the present disclosure.

FIG. 2 is a flowchart for describing an operation of a device for obtaining a heart rate according to an exemplary embodiment of the present disclosure.

Referring to FIG. 2, the heart rate obtaining device according to various exemplary embodiments of the present disclosure may obtain a visible-ray image in step S201, and measure a visible-ray based remote heart rate signal in step S203. Meanwhile, the heart rate obtaining device may obtain a movement quality score, obtain a lighting quality score, and obtain a signal quality score in steps S205, S207, and S209, respectively. Thereafter, the heart rate obtaining device may select an effective heart rate section and evaluate a heart rate signal reliability based on the quality score obtained in step S211.

Meanwhile, the heart rate obtaining device may obtain an infrared image in step S221, and measure an infrared-based remote heart rate signal in step S223. Meanwhile, the heart rate obtaining device may obtain the movement quality score, obtain the lighting quality score, and obtain the signal quality score in steps S225, S227, and S229, respectively. Thereafter, the heart rate obtaining device may select the effective heart rate section and evaluate the heart rate signal reliability based on the quality score obtained in step S231.

Thereafter, the heart rate obtaining device may be configured to determine a reliability-based complementary heart rate for visible ray and infrared signals in step S241. The description described in the present specification may be referenced for or applied to more specific contents for the operation of the heart rate obtaining device, so here, a redundant description will be omitted.

FIGS. 3 to 8 are diagrams for describing implementation examples of the device for determining a heart rate according to an exemplary embodiment of the present disclosure.

Figure 3:
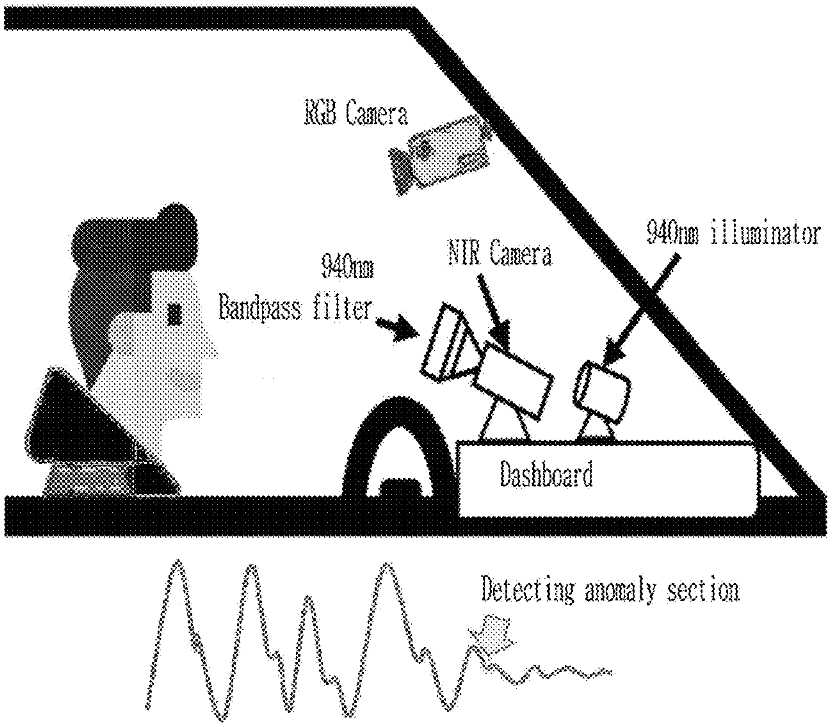
FIGS. 3 to 8 are diagrams for describing implementation examples of the device for obtaining a heart rate according to an exemplary embodiment of the present disclosure.

Referring to FIG. 3, in the heart rate obtaining device according to an exemplary embodiment of the present disclosure, an RGB camera configured for obtaining the visible-ray image, an NIR camera configured for obtaining the near infrared image, a 940 nm infrared lighting machine, and a 940 nm bandpass filter may be provided at a location that does not interfere with driving at an angle for measuring a front face of the vehicle driver.

The heart rate measured as described above by use of the element may be applied in an environment in a vehicle which is being driven. While the driver drives the vehicle, the camera may obtain an image of the driver in visible-ray and infrared bands. Thereafter, rPPG may be obtained in two images, and the heart rate with high reliability may be extracted by the method according to the exemplary embodiments described above. When the heart rate is less than or equal to a reference value, or when the heart rate shows a pattern which is not intact, there may be a problem in a condition of the driver. At the instant time, a measure to send warnings or urgent help request to the outside may be taken. As an exemplary embodiment of the present disclosure, a situation such as driver's extreme excitement and drowsy driving may also infer due to the change in heart rate. When the driver is drowsy driving, the driver may use a self audio system in the vehicle or use a lighting system. Furthermore, even when the driver is in the extreme excitement state, a lighting system or an audio system for lowering a tension of the driver may be similarly used. As yet another example, an urgent help letter may be automatically transmitted against a case where the extreme excitement state is caused due to a problem in which a danger strikes the driver.

Figure 4:
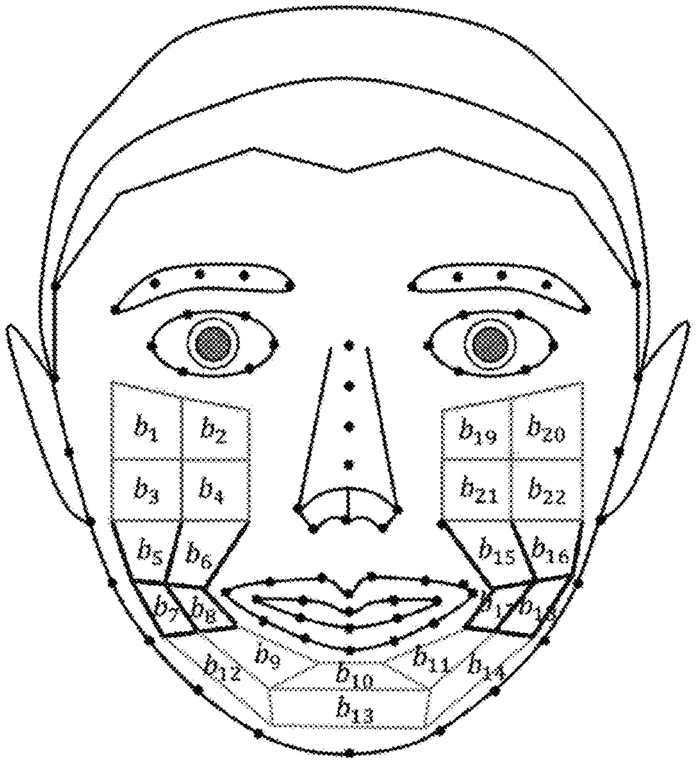

Referring to FIG. 4, in some exemplary embodiments of the present disclosure, the movement quality scores ($M_k$) including the first movement quality score and the second movement quality score may be determined by use of Equation (1) below:

$$M_k = \sum_{n=1}^{4} \left(b_{k_n} - b'_{k_n}\right) / 4 \tag{1}$$

Here, k may represent a number indicating region of interest (ROI), n may represent an index indicating a vertex of square ROI, b may represent a current frame, and b' may represent a previous frame.

In FIG. 4, a case where k includes a value of 1 to 22.

Figure 5:
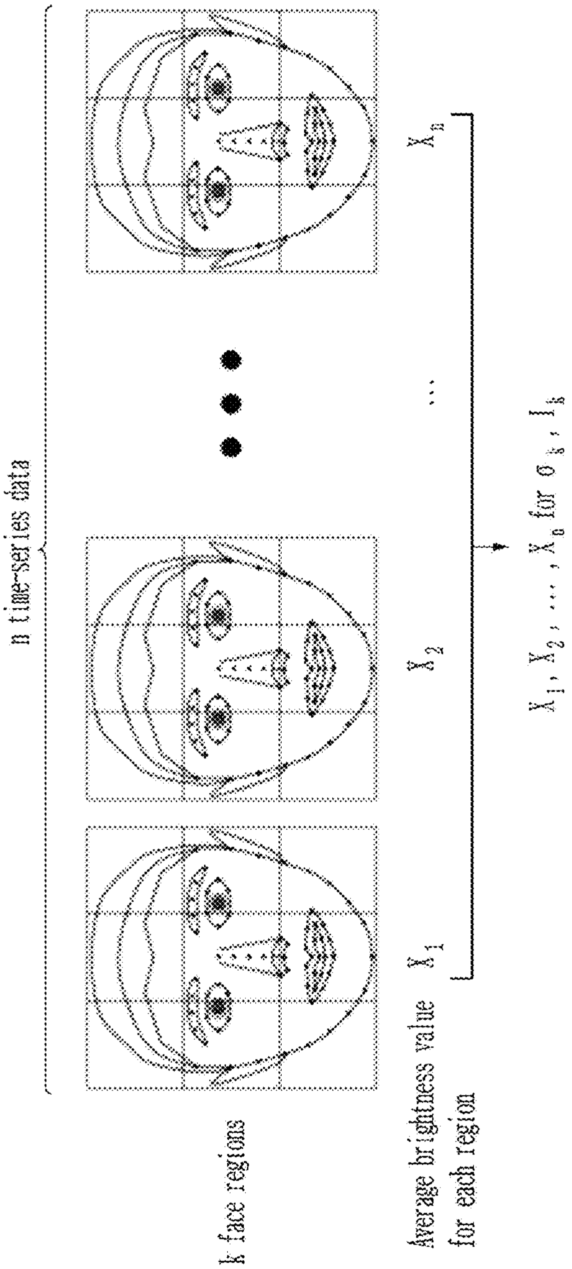

Referring to FIG. 5, in some exemplary embodiments of the present disclosure, the lighting quality scores including the first lighting quality score and the second lighting quality score may be determined by use of Equations (2), (3) and (4) below:

$$\sigma_k = \sqrt{\frac{\sum_{\gamma=1}^{n}\left(X_\gamma - \bar{X}\right)^2}{n}} \quad (2)$$

$$I_k = \mathrm{Max}(X_k) - \mathrm{Min}(X_k) \quad (3)$$

$$X_k = \{X_1, X_2, \ldots, X_n\} \quad (4)$$

Here, k may represent the sum of the number of divided regions and the total number of regions, and n may represent the number of time-series data, X may represent a brightness value and $\bar{X}$ represents the mean value of X. For example, when the image obtained by the image acquisition module 110 is divided into 3×3=9 divided regions, a total of 10 ROIs including 9 divided regions and an entire region indicating a face region in the image may be determined.

Figure 6:
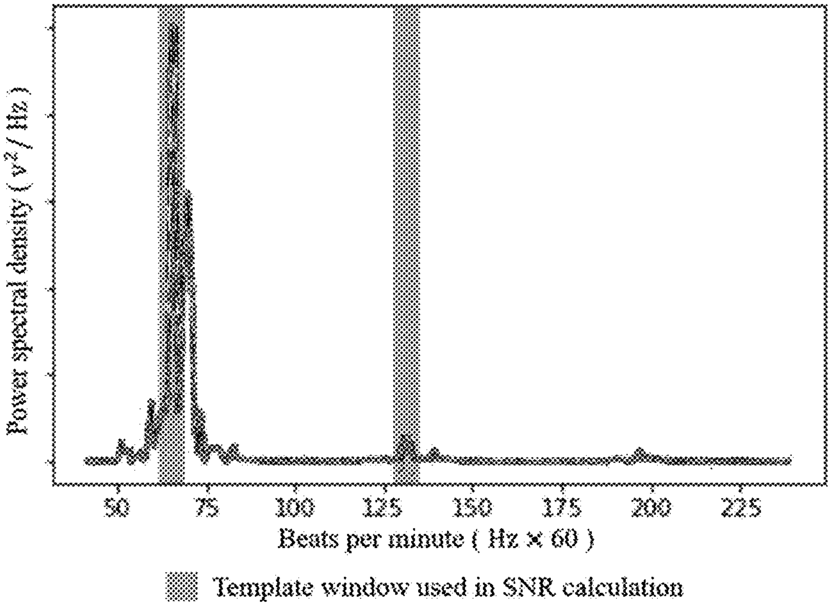

The quality score computation module 130 may be configured to determine a quality score including a standard deviation $\sigma_k$ for a brightness change on the time series and a difference Ik between a maximum value and a minimum value of a brightness change amount from a total of 10 ROIs. Referring to FIG. 6, in some exemplary embodiments of the present disclosure, the signal quality scores including the first signal quality score and the second signal quality score may be determined by use of Equation (5) below:

$$SNR = 10\log_{10}\left(\frac{\sum_{42}^{180}\left(U_t(f)\hat{S}(f)\right)^2}{\sum_{42}^{180}\left((1 - U_t(f))\hat{S}(f)\right)^2}\right) \quad (5)$$

Here, $U_t(f)$ may represent a template window binary function, and $\hat{S}(f)$ may represent a power spectral density function. The template window binary function as a function used for cutting and separating, and analyzing a signal in a specific part to a window in signal processing may be implemented so that a part corresponding to the window includes a value of 1 and other parts include a value of 0. The power spectral density function is a function indicating how large energy a signal in each frequency to analyze the frequency characteristics of the signal.

Figure 7:
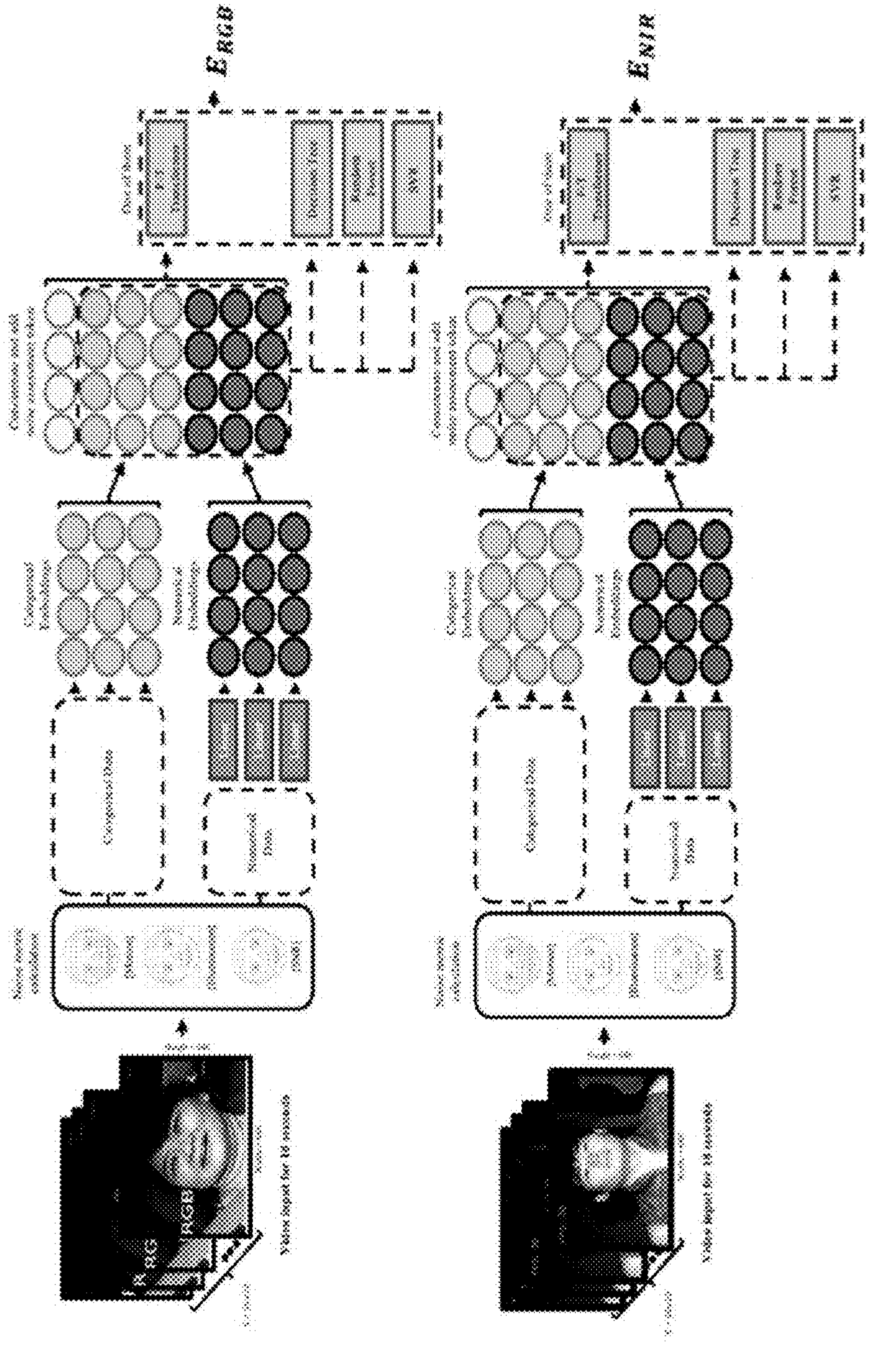

Referring to FIG. 7, an implementation example of determining the reliability-based complementary heart rate for the visible-ray and infrared signals is illustrated. A final complementary heart rate determination may be based on a quality prediction value for each input, and quality prediction may be modeled through error learning between the remote heart rate and an actual heart rate. A final weight may indicate a reliability for each measurement, and the complementary heart rate may be determined through $W_{RGB}$ and $W_{NIR}$. An equation of a final heart rate (BPM) through a quality based weight sum may be as follows.

$$\text{input: } E_{RGB}, E_{NIR}$$

$$\text{Quality} = \{1 - \text{MINMAX}(E_{RGB}),\ 1 - \text{MIN}MAC(E_{NIR})\}$$

$$\text{Quality} = \{Q_{RGB}, Q_{NIR}\}$$

$$\text{Set } Q_{s\in\{RGB,NIR\}} = \begin{cases} Q_s & \text{for to 10\% in dataset} \\ 0 & \text{for bottom 90\%} \end{cases}$$

$$\text{Softmax(Quality)} = \{W_{RGB}, W_{NIR}\}$$

$$\text{OUTPUT} = \begin{cases} BPM & \text{for } Q_{RGB} > 0 \text{ or } Q_{NIR} > 0, \\ \text{NONE} & \text{for } Q_{RGB} = 0 \text{ and } Q_{NIR} = 0 \end{cases}$$

Here, $E_{RGB}$ may represent an error prediction of a model for visible-ray measurement, $E_{NIR}$ may represent an error prediction of a model for infrared measurement, $W_{RGB}$ may represent a determination result of a visible-ray measurement weight, and $W_{NIR}$ may present a determination result of an infrared measurement weight. $BPM_{RGB}$ and $BPM_{NIR}$ may represent a visible-ray heart rate and an infrared heart rate, respectively, MINMAX(x) may represent a min-max normalization defined through an error prediction measured from a dataset, Softmax(x) may represent a max-min normalization defined through the error prediction measured from the dataset, BPM may represent a complementary rPPG measurement based final predicted heart rate, and NONE may mean a measurement filtered by a quality based selection method, i.e., an unreliable measurement.

The prediction errors $E_{RGB}$ and $E_{NIR}$ of the model may become the max-min normalization based on the dataset, and since the error is in inverse proportion to the quality, the quality value may be determined by subtracting a normalized error value from 1.0.

The highest 10% may be selected based on the dataset, weights $W_{RGB}$ and $W_{NIR}$ may be obtained through the selected result, and the final heart rate BPM may be determined. Here, when the final heart rate is NONE, it is determined that the final heart rate is unreliable, and the final heart rate may be excluded from measurement.

TABLE 1

| Type | Purpose | Data amount/distribution |
|---|---|---|
| Video | Bio-Signal (Photoplethysmography (PPG) Signal) | Experiment subject number: 20 persons, A total of 80 cases, (Average 120 seconds/case)<br>[Experiment scenario]<br>Motion: Head movement allowed, and conversation and expression limited<br>Motion talk: Head movement allowed, and conversation and expression allowed |

TABLE 1-continued

| Type | Purpose | Data amount/distribution |
|---|---|---|
| | | Still: Head movement limited, and conversation and expression limited<br>Still talk: Head movement limited, and conversation and expression allowed |

TABLE 2

| | Total | | Still | | Motion | |
|---|---|---|---|---|---|---|
| SMU Dataset | PTE6 | MAPE | PTE6 | MAPE | PTE6 | MAPE |
| Visible ray | 86.87% | 4.82% | 90.65% | 3.68% | 82.69% | 6.12% |
| Infrared | 66.63% | 11.15% | 72.24% | 8.76% | 61.13% | 14.15% |
| Complementary rPPG | 95.73% | 1.95% | 96.23% | 1.69% | 94.49% | 2.63% |

Through Tables 1 and 2, performance enhancement may be confirmed when applying the complementary rPPG measurement technology. A dataset for the experiment may be obtained, which includes movements in an indoor environment of a 20 person-scale. A total of 80 data may be obtained, and an experimental result measured in a face video of approximately 2 hours and 40 minutes as a measurement time of 2 minutes per case is organized through Table 2. When an actual complementary rPPG measurement method is applied, higher accuracy than single sensor measurement may be confirmed. At the instant time, an accuracy enhancement width is larger in a "motion" with a lot of noise. The present result may be a result corresponding to a quality based selection method purpose which learn and infers an environment with a lot of noise through the error prediction model, and makes an inference including an actual high quality be included in the measurement to enhance accuracy.

Figure 8:
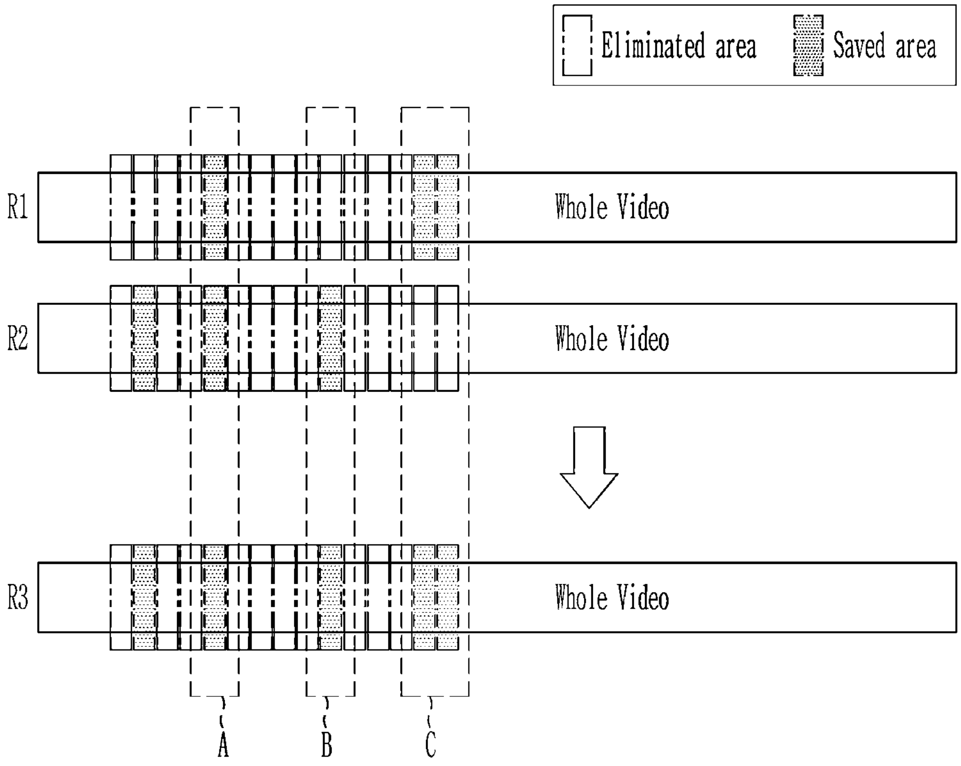

Referring to FIG. 8, R1 represents the first effective heart rate section caused from an RGB camera, and R2 represents a second effective heart rate section caused from an infrared camera. Furthermore, R3 represents a complementary heart rate section determined based the first effective heart rate section and the second effective heart rate section by the complementary heart rate determination module 160. It may be seen that in a region represented by A, a common effective heart rate section for R1 and R2 is included in R3, and in a region represented by B, the corresponding section does not correspond to an effective heart rate section in R1, but is supplemented by R2, and is included as the effective heart rate section in R3. Furthermore, it may be seen that in a region represented by C, the corresponding section does not correspond to the effective heart rate section in R2, but is supplemented by R1 and included as the effective heart rate section in R3.

Figure 9:
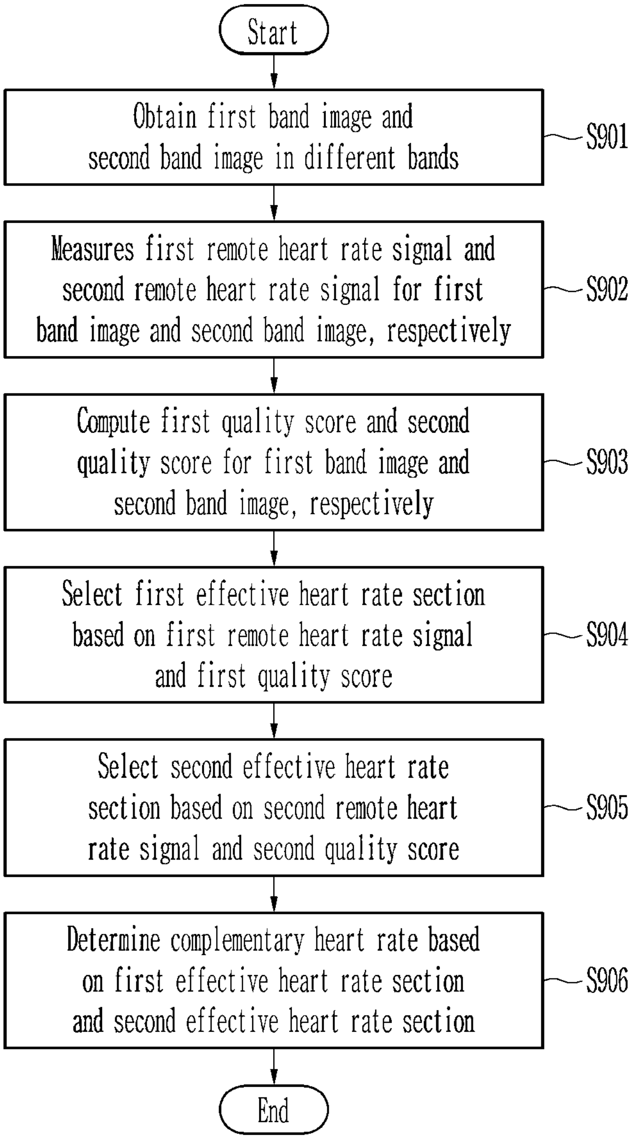
FIG. 9 is a flowchart for describing a method for determining a heart rate according to an exemplary embodiment of the present disclosure.

FIG. 9 is a flowchart for describing a method for determining a heart rate according to an exemplary embodiment of the present disclosure.

Referring to FIG. 9, the heart rate obtaining method according to various exemplary embodiments of the present disclosure may include obtaining a first band image and a second band image in different bands (S901), measuring a first remote heart rate signal and a second remote heart rate signal for the first band image and the second band image, respectively (S902), measuring the first remote heart rate signal and the second remote heart rate signal for the first band image and the second band image, respectively (S903), selecting a first effective heart rate section based on the first remote heart rate signal and a first quality score (S904), selecting a second effective heart rate section based on the second remote heart rate signal and a second quality score (S905), and determining a complementary heart rate based on the first effective heart rate section and the second effective heart rate section (S906). The description described in the present specification may be referenced for or applied to more specific contents for the method, so here, a redundant description will be omitted.

Figure 10:
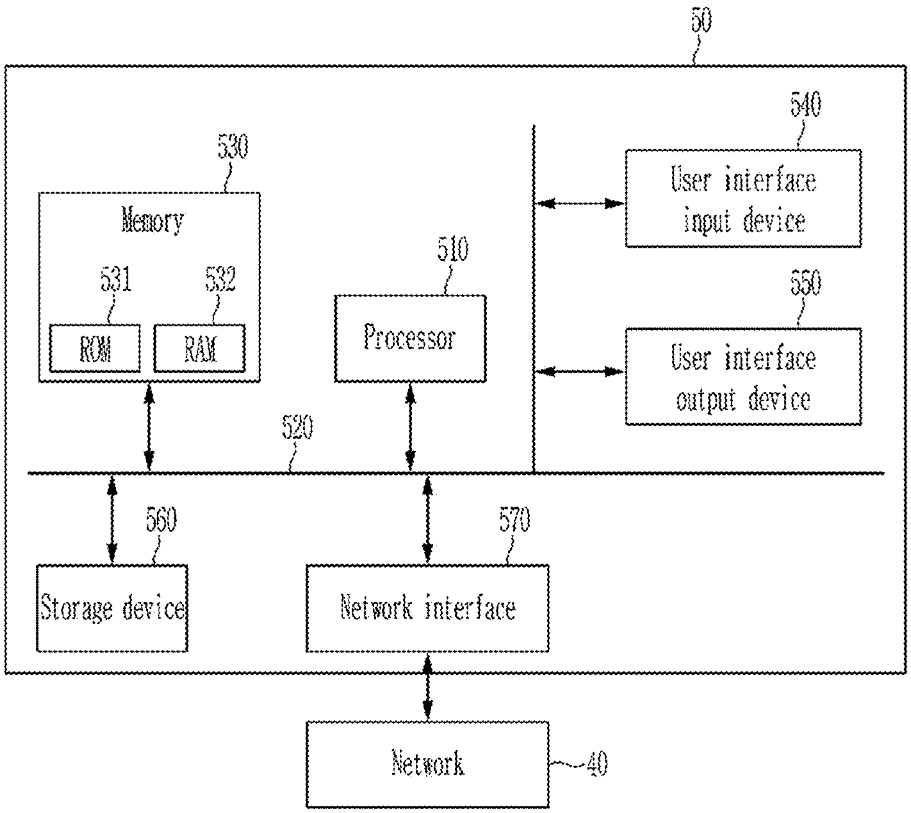
FIG. 10 is a diagram for describing a computing device according to an exemplary embodiment of the present disclosure.

FIG. 10 is a diagram for describing a computing device according to an exemplary embodiment of the present disclosure.

Referring to FIG. 10, the device and the method for obtaining a heart rate according to exemplary embodiments of the present disclosure may be implemented by use of a computing device 50.

The computing device 50 may include at least one of a processor 510, a memory 530, a user interface input device 540, a user interface output device 550, and a storage device 560 which communicate with each other through a bus 520. The computing device 50 may also include a network interface 570 electrically connected to a network 40. The network interface 570 may transmit or receive a signal to or from another entity through the network 40.

The processor 510 may be implemented as various types including a micro controller unit (MCU), an application processor (AP), a central processing unit (CPU), a graphic processing unit (GPU), a neural processing unit (NPU), and a quantum processing unit (QPU), and may be an arbitrary semiconductor device that executes an instruction stored in the memory 530 or the storage device 560. The processor 510 may be configured to implement the functions and methods in relation to FIG. 1, FIG. 2, FIG. 3, FIG. 4, FIG. 5, FIG. 6, FIG. 7, FIG. 8 and FIG. 9.

The memory 530 and the storage device 560 may be various types of volatile or non-volatile storage media. For example, the memory may include a read only memory (ROM) 531 and a random access memory (RAM) 532. In the exemplary embodiment of the present disclosure, the memory 530 may be positioned inside or outside the processor 510 and connected to the processor 510 by various well-known means.

In some exemplary embodiments of the present disclosure, at least some components or functions of the device and the method for obtaining a heart rate according to the exemplary embodiments of the present disclosure may be implemented as a program or software executed by the computing device 50 or the program or software may be stored in a computer readable medium. The computer-readable medium according to various exemplary embodiments of the present disclosure may record a program for executing the steps included in the device and the method for obtaining a heart rate according to the exemplary embodiments in a computer including a processor 510 executing a program or an instruction stored in a memory 530 or a storage device 560.

In some exemplary embodiments of the present disclosure, at least some components or functions of the device and the method for obtaining a heart rate according to the exemplary embodiments of the present disclosure may be implemented by hardware or a circuit of the computing device 50, or also implemented as a separate hardware or circuit which may be electrically connected to the computing device 50.

According to exemplary embodiments of the present disclosure, even if a variety of lighting changes, including solar light, traffic lights, or transportation traffic lights in the vehicle driving environment, or noise such as the movement of the face of the driver or passenger, a remote heart rate with high accuracy and reliability may be determined for a driver or a passenger in a vehicle.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for obtaining a heart rate, the apparatus comprising:

one or more processors; and one or more memory devices operatively connected to the one or more processors, wherein the one or more memory devices include program codes, and wherein the program codes are executed by the one or more processors to:

obtain a first band image and a second band image in different bands, measure a first remote heart rate signal and a second remote heart rate signal for the first band image and the second band image, respectively, determine a first quality score and a second quality score for the first band image and the second band image, respectively, select a first effective heart rate section based on the first remote heart rate signal and the first quality score, select a second effective heart rate section based on the second remote heart rate signal and the second quality score, and determine a complementary heart rate based on the first effective heart rate section and the second effective heart rate section.

2. The apparatus of claim 1, wherein in the determining of the first quality score and the second quality score, the one or more processors is configured to determine a first movement quality score and a second movement quality score, wherein the one or more processors is configured to determine the first movement quality score by measuring a change of a face feature point in frames adjacent to each other with respect to the first band image, and wherein the one or more processors is configured to determine the second movement quality score by measuring a change of a face feature point in frames adjacent to each other with respect to the second band image.

3. The apparatus of claim 1, wherein in the determining of the first quality score and the second quality score, the one or more processors is configured to determine a first lighting quality score and a second lighting quality score, wherein the one or more processors is configured to determine the first lighting quality score by measuring a brightness change amount with respect to the first band image, and wherein the one or more processors is configured to determine the second lighting quality score by measuring a brightness change amount with respect to the second band image.

4. The apparatus of claim 1, wherein in the determining of the first quality score and the second quality score, the one or more processors is configured to determine a first signal quality score and a second signal quality score, wherein the one or more processors is configured to determine the first signal quality score by measuring a signal quality based on frequency spectrum characteristics which a remote heart rate signal has with respect to the first band image, and wherein the one or more processors is configured to determine the second signal quality score by measuring the signal quality based on frequency spectrum characteristics which the remote heart rate signal has with respect to the second band image.

5. The apparatus of claim 1, wherein in the selecting of the first effective heart rate section, the one or more processors is configured to:

predict an error value from a model trained through the first quality score, make a section in which the predicted error value is less than or equal to a predetermined first threshold be included in the first effective heart rate section, and make a section in which the predicted error value is more than the first threshold be not included in the first effective heart rate section.

6. The apparatus of claim 5, wherein in the selecting of the second effective heart rate section, the one or more processors is configured to:

predict an error value from a model trained through the second quality score, make a section in which the predicted error value is less than or equal to a predetermined second threshold be included in the second effective heart rate section, and make a section in which the predicted error value is more than the second threshold be not included in the second effective heart rate section.

7. The apparatus of claim 6, wherein the first threshold is determined as an error value corresponding to a highest x % in which the error value of a result predicted from the model trained through the first quality score is a smallest, wherein the second threshold is determined as an error value corresponding to a highest y % in which the error value of a result predicted from the model trained through the second quality score is a smallest, and wherein the x is a positive real number and the y is a positive real number.

8. The apparatus of claim 6, wherein the model includes at least one of a Long Short-Term Memory (LSTM) model, a random forest model, and a Singular value Decomposition (SVD) model.

9. The apparatus of claim 1, wherein in the determining of the complementary heart rate, the one or more processors is configured to determine the complementary heart rate by use of a predetermined weight in response that a partial section of the first effective heart rate section and a partial section of the second effective heart rate section are overlapped, and heart rates predicted in the overlapped sections are different from each other.

10. The apparatus of claim 1, wherein the first band image includes a visible-ray image, and the second band image includes an infrared image.

11. An apparatus for obtaining a heart rate, the apparatus comprising:

one or more processors; and one or more memory devices operatively connected to the one or more processors, wherein the one or more memory devices include program codes, and wherein the program codes are executed by the one or more processors to:

obtain a first band image and a second band image in different bands, measure a first remote heart rate signal and a second remote heart rate signal for the first band image and the second band image, respectively, compute a movement quality score, a lighting quality score, and a signal quality score for each of the first band image and the second band image, select a first effective heart rate section based on the first remote heart rate signal and the first quality score, select a second effective heart rate section based on the second remote heart rate signal and the second quality score, and determine a complementary heart rate based on the first effective heart rate section and the second effective heart rate section.

12. The apparatus of claim 11, wherein the one or more processors is configured to determine the movement quality score by use of Equation (1) below:

$$M_k = \sum_{n=1}^{4} \left(b_{k_n} - b'_{k_n}\right)/4 \tag{1}$$

wherein k represents a number indicating region of interest (ROI), n represents an index indicating a vertex of square ROI, b represents a current frame, and b' represents a previous frame.

13. The apparatus of claim 11, wherein the one or more processors is configured to determine the lighting quality score by use of Equations (2), (3) and (4) below:

$$\sigma_k = \sqrt{\frac{\sum_{\gamma=1}^{n} \left(X_\gamma - \bar{X}\right)^2}{n}} \tag{2}$$

$$I_k = \mathrm{Max}(X_k) - \mathrm{Min}(X_k) \tag{3}$$

$$X_k = \{X_1, X_2, \ldots, X_n\}, \tag{4}$$

wherein k represents the sum of the number of divided regions and the total number of regions, and n represents the number of time-series data, X represents a brightness value, and $\bar{X}$ represents the mean value of X.

14. The apparatus of claim 11, wherein the one or more processors is configured to determine the signal quality score by use of Equation (5) below:

$$SNR = 10\log_{10}\left(\frac{\sum_{42}^{180} \left(U_t(f)\hat{S}(f)\right)^2}{\sum_{42}^{180} \left((1 - U_t(f))\hat{S}(f)\right)^2}\right) \tag{5}$$

wherein $U_t(f)$ represents a template window binary function, and $\hat{S}(f)$ represents a power spectral density function.

15. The apparatus of claim 11, wherein in the selecting of the first effective heart rate section, the one or more processors is configured to:

predict an error value from a model trained through the first quality score, make a section in which the predicted error value is less than or equal to a predetermined first threshold be included in the first effective heart rate section, and make a section in which the predicted error value is more than the first threshold be not included in the first effective heart rate section.

16. The apparatus of claim 15, wherein in the selecting of the second effective heart rate section, the one or more processors is configured to:

predict an error value from a model trained through the second quality score, make a section in which the predicted error value is less than or equal to a predetermined second threshold be included in the second effective heart rate section, and make a section in which the predicted error value is more than the second threshold be not included in the second effective heart rate section.

17. A method for obtaining a heart rate, the method including:

obtaining, by a processor, a first band image and a second band image in different bands;

measuring, by the processor, a first remote heart rate signal and a second remote heart rate signal for the first band image and the second band image, respectively;

determining, by the processor, a first quality score and a second quality score for the first band image and the second band image, respectively;

selecting, by the processor, a first effective heart rate section based on the first remote heart rate signal and the first quality score;

selecting, by the processor, a second effective heart rate section based on the second remote heart rate signal and the second quality score; and determining, by the processor, a complementary heart rate based on the first effective heart rate section and the second effective heart rate section.

18. The method of claim 17, wherein the determining of the first quality score and the second quality score includes determining a first movement quality score and a second movement quality score, wherein the first movement quality score is determined, by the processor, by measuring a change of a face feature point in frames adjacent to each other with respect to the first band image, and wherein the second movement quality score is determined, by the processor, by measuring a change of a face feature point in frames adjacent to each other with respect to the second band image.

19. The method of claim 17, wherein the determining of the first quality score and the second quality score includes determining a first lighting quality score and a second lighting quality score, wherein the first lighting quality score is determined, by the processor, by measuring a brightness change amount with respect to the first band image, and wherein the second lighting quality score is determined, by the processor, by measuring a brightness change amount with respect to the second band image.

20. The method of claim 17, wherein the determining of the first quality score and the second quality score includes determining a first signal quality score and a second signal quality score, wherein the first signal quality score is determined, by the processor, by measuring a signal quality based on frequency spectrum characteristics which a remote heart rate signal has with respect to the first band image, and wherein the second signal quality score is determined, by the processor, by measuring the signal quality based on frequency spectrum characteristics which the remote heart rate signal has with respect to the second band image.

* * * * *